United States Patent [19]

Harakawa et al.

[11] Patent Number: 5,763,526
[45] Date of Patent: Jun. 9, 1998

[54] URETHANE PREPOLYMER, PROCESS FOR PRODUCING URETHANE PREPOLYMER, ISOCYANATE COMPOUND, AND POLYURETHANE DISPERSION

[75] Inventors: Tsuyoshi Harakawa; Hisaki Tanabe, both of Kyoto, Japan

[73] Assignee: Nippon Paint Co., Ltd., Osaka, Japan

[21] Appl. No.: 689,024

[22] Filed: Jul. 30, 1996

[30] Foreign Application Priority Data

Jul. 31, 1995 [JP] Japan ..................... 7-215193

[51] Int. Cl.⁶ .................. C08J 3/00; C08G 18/28
[52] U.S. Cl. .............. 524/590; 524/591; 524/839; 524/840; 528/71
[58] Field of Search .................. 528/71; 524/590, 524/291, 839, 840

[56] References Cited

U.S. PATENT DOCUMENTS

| | | | |
|---|---|---|---|
| 5,561,187 | 10/1996 | Bechara et al. | 524/591 |
| 5,608,000 | 3/1997 | Duan et al. | 528/71 |
| 5,610,232 | 3/1997 | Duan et al | 528/71 |

*Primary Examiner*—John M. Cooney, Jr.
*Attorney, Agent, or Firm*—Sughrue, Mion, Zinn, Macpeak & Seas, PLLC

[57] ABSTRACT

A polyurethane dispersion is disclosed, which is obtained by a process comprising the step of reacting a urethane prepolymer having both at least one anionic group and at least one cationic group in the molecule and having an isocyanate group at each of molecular ends thereof with a chain extender in water. The polyurethane dispersion is capable of forming a coating film having high acid and alkali resistance and has satisfactory dispersion stability.

20 Claims, 4 Drawing Sheets

URETHANE PREPOLYMER, PROCESS FOR PRODUCING URETHANE PREPOLYMER, ISOCYANATE COMPOUND, AND POLYURETHANE DISPERSION

FIELD OF THE INVENTION

The present invention relates to a prepolymer and a dispersion. More particularly, this invention relates to a urethane prepolymer and a polyurethane dispersion.

BACKGROUND OF THE INVENTION

In the field of water-borne coatings, attention is now focused on self-emulsified polyurethane dispersions capable of forming a tough film which has not only satisfactory chemical and water resistance but also high impact resilience and high abrasion resistance. Water-borne coatings can be roughly divided into three groups by the state of the film-forming component; (1) aqueous solution type, (2) aqueous dispersion type (colloidal dispersion), and (3) emulsion type. Self-emulsified polyurethane dispersions belong to the water-borne coatings of the aqueous dispersion type, which have properties between the aqueous solution type paints and the emulsion type paints.

Generally known as such self-emulsified polyurethane dispersions are anionic or cationic polyurethane dispersions and nonionic dispersions. The former dispersions are dispersions comprising a polyurethane having anions (e.g., —COO⁻) or cations (e.g., quaternary ammonium) in the molecule, dispersed in water, while the latter dispersions are dispersions comprising a polyurethane having a poly(ethylene oxide) chain in the molecule, dispersed in water.

The anionic or cationic type, self-emulsified polyurethane dispersions have poor suitability for practical use because the coating films formed therefrom have extremely either poor acid or alkali resistance, although capable of being satisfactory in some film properties (e.g., impact resilience and abrasion resistance).

On the other hand, the nonionic type self-emulsified polyurethane dispersions have a disadvantage that the dispersion stability thereof is low because of the low emulsifiability of the polyurethanes and a film having satisfactory appearance and excellent water resistance is difficult to form therefrom.

SUMMARY OF THE INVENTION

An object of the present invention is to realize a polyurethane dispersion which is capable of forming a film having high acid and alkali resistance and has satisfactory dispersion stability.

Another object of the present invention is to provide a novel urethane prepolymer capable of forming such the polyurethane dispersion.

The urethane prepolymer according to the present invention has both at least one anionic group and at least one cationic group in the molecule and has an isocyanate group at each of molecular ends thereof.

The urethane prepolymer according to the present invention comprises: one or more structural units $U_1$ each having both an anionic group and a cationic group and represented by formula (1); structural units $U_2$ each comprising a hydrocarbon group having 4 to 13 carbon atoms; and one or more structural units $U_3$ each having a chain structure corresponding to that formed by removing at least two hydroxyl groups from a polyol compound. The structural units $U_1$, $U_2$, and $U_3$ are bonded to each other by a urethane bond in such a manner that each structural unit $U_1$ is bonded to a structural unit $U_1$ or $U_3$ through a structural unit $U_2$ and each structural unit $U_3$ is bonded to a structural unit $U_3$ or $U_1$ through a structural unit $U_2$, and that each terminal unit is a structural unit $U_2$ having an isocyanate group bonded at the end thereof.

In formula (1), $R^1$ represents an alkylene group having 1 or 2 carbon atoms. $R^2$ represents an alkylene group having 2 to 4 carbon atoms and having either one bonding site for a structural unit $U_2$ or two bonding sites for structural units $U_2$. $R^3$ represents an alkylene group having 2 to 4 carbon atoms when $R^2$ is an alkylene group having one bonding site for a structural unit $U_2$, and represents a hydrogen atom or an alkyl group having 1 to 12 carbon atoms when $R^2$ is an alkylene group having two bonding sites for structural units $U_2$. X represents —$SO_3^-$, —$PO_3^-$, or —$COO^-$.

This urethane prepolymer, for example, has a structure in which $R^2$ and $R^3$ contained in the structural units $U_1$ each is an alkylene group having 2 to 4 carbon atoms and one bonding site for a structural unit $U_2$, the structural units $U_2$ each is an aliphatic hydrocarbon group, and the structural units $U_3$ each is at least one polymer chain selected from the group consisting of polycarbonate chains, polyester chains, polyether chains, and polysiloxane chains.

Further, the urethane prepolymer, for example, has a structure in which X contained in the structural units $U_1$ is —$SO_3^-$, the structural units $U_2$ each is the aliphatic hydrocarbon group represented by formula (2):

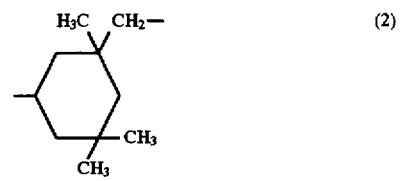

and the structural units $U_3$ each is a polycarbonate chain.

Furthermore, the urethane prepolymer, for example, has a weight-average molecular weight of from 1,500 to 30,000 and an acid value of from 10 to 100.

A process for producing the urethane prepolymer according to the present invention comprises the steps of:
reacting a first polyol compound having an anionic group and a cationic group in the molecule with a polyisocyanate compound, the amount of the polyisocyanate compound being at least two equivalents to the first polyol compound, to obtain an isocyanate compound having at each of molecular ends thereof an isocyanate group derived from the polyisocyanate compound; and
reacting the isocyanate compound with a second polyol compound, the amount of the second polyol compound being less than equivalent to the isocyanate compound, to obtain a polymer compound having at each of molecular ends thereof an isocyanate group derived from the isocyanate compound.

Another process for producing the urethane prepolymer according to the present invention comprises the steps of:
reacting a first polyol compound having an anionic group and a cationic group in the molecule with a polyisocyanate compound, the amount of the polyisocyanate compound being at least two equivalents to the first polyol compound, to obtain an isocyanate compound having at each of molecular ends thereof an isocyanate group derived from the polyisocyanate compound;

reacting the isocyanate compound with a second polyol compound, the amount of the second polyol compound being more than equivalent to the isocyanate compound, to obtain a first polymer compound having at each of molecular ends thereof a hydroxyl group derived from the second polyol compound; and reacting the first polymer compound with a polyisocyanate compound, the amount of the polyisocyanate compound being at least two equivalents to the first polymer compound, to obtain a second polymer compound having at each of molecular ends thereof an isocyanate group derived from the polyisocyanate compound.

Further, another process for producing the urethane prepolymer according to the present invention comprises the steps of reacting a polyol compound and a polyisocyanate compound so that the isocyanate group is located at the plural ends of the product thereof.

The polyol compound used includes an amphoteric polyol compound having an anionic group and a cationic group in the molecule.

The isocyanate compound of the present invention is represented by formula (3).

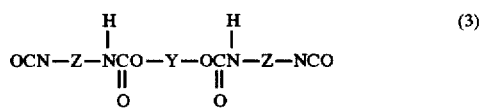

In formula (3), Y is a structural unit represented by formula (4) and Z represents a hydrocarbon group having 4 to 13 carbon atoms.

In formula (4), $R^1$ represents an alkylene group having 1 or 2 carbon atoms. $R^2$ represents an alkylene group having 2 to 4 carbon atoms and having either a bonding site for one of the two urethane-bonding parts contained in formula (3) or bonding sites for the two urethane-bonding parts contained in formula (3). $R^3$ represents an alkylene group having 2 to 4 carbon atoms when $R^2$ has a bonding site for one of the two urethane-bonding parts, and represents a hydrogen atom or an alkyl group having 1 to 12 carbon atoms when $R^2$ has bonding sites for the two urethane-bonding parts. X represents $-SO_3^-$, $-PO_3^-$, or $-COO^-$.

The polyurethane dispersion of the present invention is obtained by a process comprising the step of reacting a urethane prepolymer having both at least one anionic group and at least one cationic group in the molecule and having an isocyanate group at each of molecular ends thereof with a chain extender in water.

DETAILED DESCRIPTION OF THE INVENTION

Urethane Prepolymer

Figure 1:
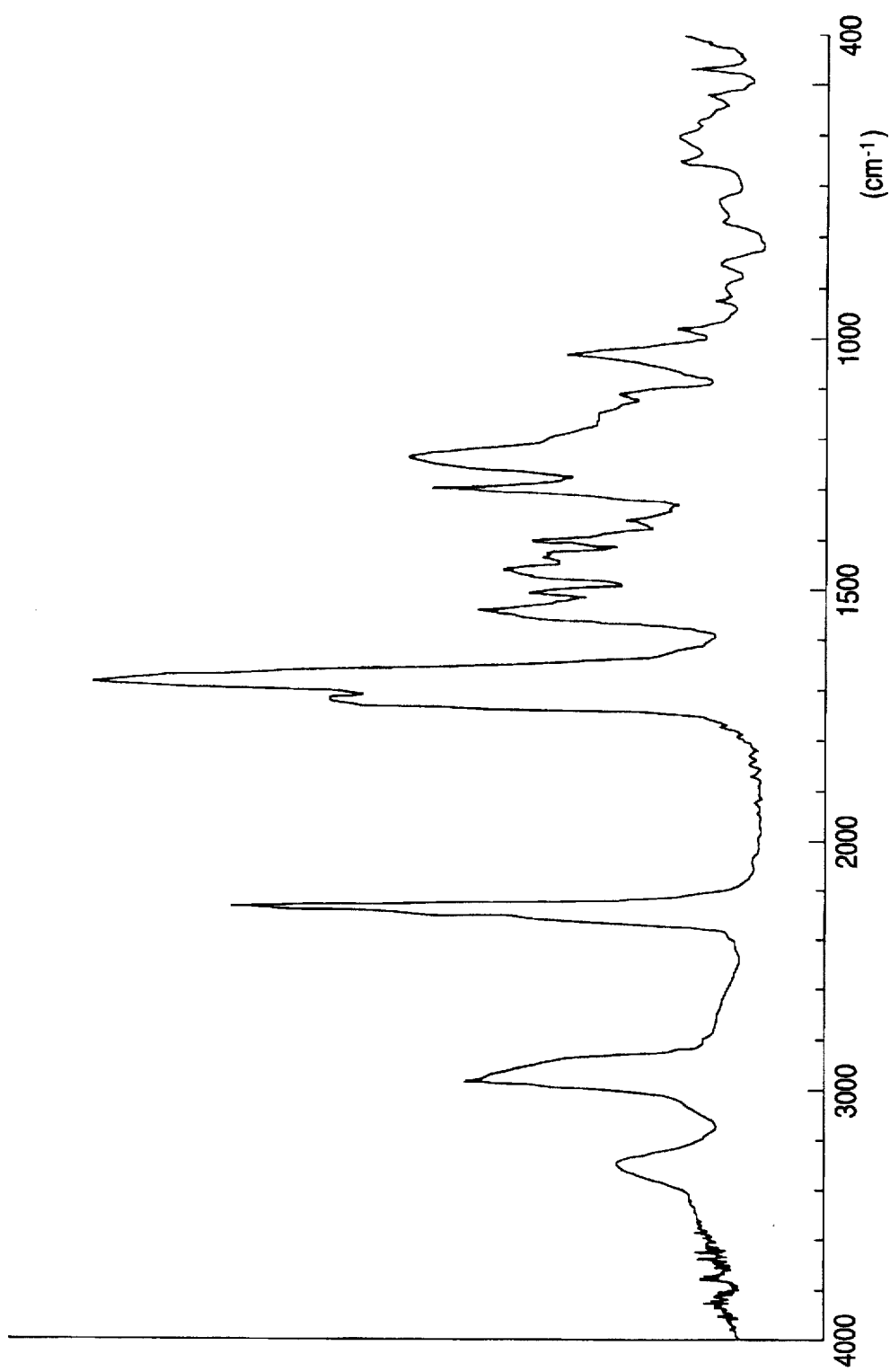
FIG. 1 is an infrared absorption spectrum of the diisocyanate compound obtained in Example 1.

The urethane prepolymer of the present invention has both at least one anionic group and at least one cationic group in the molecule.

Examples of the anionic group include $-SO_3^-$, $-PO_3^-$, and $-COO^-$. Examples of the cationic group include quaternary ammonium groups. Two or more anionic groups and two or more cationic groups may be contained in each molecule. In this case, the anionic or cationic groups contained in each molecule may be of one kind or two or more kinds.

The urethane prepolymer according to the present invention has a linear or branched structure. In the case where the urethane prepolymer has a linear structure, it has two molecular ends. In the case where the urethane prepolymer has a branched structure, it has at least three molecular ends. At least two molecular ends of such a urethane prepolymer each has an isocyanate group bonded thereto.

The urethane prepolymer according to the present invention comprises the following three kinds of structural units.

Structural unit $U_1$: A structural unit having both an anionic group and a cationic group.

Structural unit $U_2$: A structural unit comprising a hydrocarbon group.

Structural unit $U_3$: A structural unit having a chain structure corresponding to the structure formed by removing at least two hydroxyl groups from a polyol compound.

Structural unit $U_1$ is, for example, represented by formula (1).

In formula (1), $R^1$ is an alkylene group having 1 or 2 carbon atoms, specifically such as a methylene or ethylene group.

$R^2$ is an alkylene group having 2 to 4 carbon atoms. This alkylene group either has one bonding site for another structural unit (specifically, structural unit $U_2$ as described later) or has two bonding sites for other structural units (likewise, structural units $U_2$ as described later). The term "bonding site" herein means a site at which the alkylene group is capable of being bonded to another structural unit through a urethane bond as described later. Examples of the alkylene group having one bonding site include ethylene, propylene, and butylene groups. Examples of the alkylene group having two bonding sites include the groups shown below, in each of which the right end is bonded to the N in formula (1).

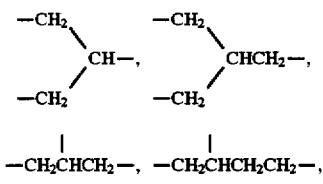

—CH₂CH₂CHCH₂—

$R^3$ is determined by the kind of $R^2$. Specifically, when $R^2$ is an alkylene group having one bonding site, $R^3$ is an alkylene group having 2 to 4 carbon atoms like $R^2$. Examples of this alkylene group include ethylene, propylene, and butylene groups as in the case of $R^2$. On the other hand, when $R^2$ is an alkylene group having two bonding sites, $R^3$ is a hydrogen atom or an alkyl group having 1 to 12 carbon atoms. Examples of the alkyl group having 1 to 12 carbon atoms include linear alkyl groups such as methyl, ethyl, n-propyl, n-butyl, pentyl, hexyl, and dodecyl and branched alkyl groups such as isopropyl, isobutyl, and t-butyl.

X is an anionic group, such as $-SO_3^-$, $-PO_3^-$, or $-COO^-$.

Specific examples of structural unit $U_1$ include the following.

(Examples of $U_1$ when $R^2$ is an alkylene group having one bonding site)

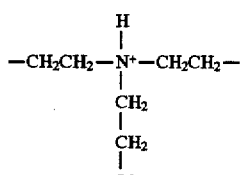

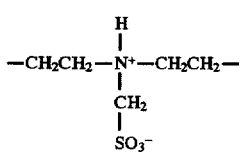

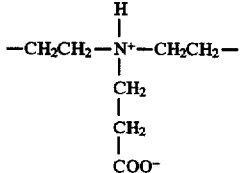

(Examples of $U_1$ when $R^2$ is an alkylene group having two bonding sites)

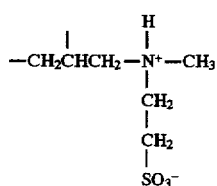

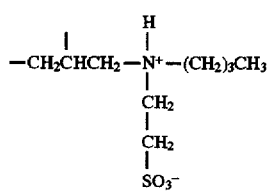

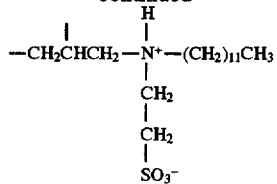

In the case where two or more structural units $U_1$ are contained in the urethane prepolymer of the present invention, these structural units $U_1$ may be of two or more kinds.

Structural unit $U_2$ may be either an aliphatic hydrocarbon group or an aromatic hydrocarbon group, as long as these groups each has 4 to 13 carbon atoms. These hydrocarbon groups may be branched. In this specification, aliphatic hydrocarbon groups and aromatic hydrocarbon groups are distinguished from each other as follows. Hydrocarbon groups having an aromatic ring bonded to the urethane bond which is described later are regarded as aromatic hydrocarbon groups. On the other hand, hydrocarbon groups which, even when having an aromatic ring, have no aromatic ring bonded to the urethane bond are regarded as aliphatic hydrocarbon groups. Hydrocarbon groups containing no aromatic ring are, of course, regarded as aliphatic hydrocarbon groups.

Examples of the aliphatic hydrocarbon group include hexamethylene and trimethylhexamethylene. Examples of aliphatic hydrocarbon groups containing one or more alicyclic rings include the group represented by formula (2), methylcyclohexylene, and 4,4'-methylenebis(cyclohexyl). Examples of the groups which contain an aromatic ring but are regarded in this specification as aliphatic hydrocarbon groups because the aromatic ring is not bonded to the urethane bond include m-tetramethylxylylene. The aliphatic hydrocarbon group represented by formula (2), which contains an alicyclic ring, corresponds to the hydrocarbon group formed from isophorone diisocyanate by removing the two isocyanate groups. Examples of the aromatic hydrocarbon group include tolylene, xylylene, and 4,4'-methylenebis(phenyl).

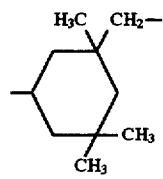
(2)

Two or more kinds of structural units $U_2$ may be contained in the urethane prepolymer of the present invention.

Structural unit $U_3$ is derived from a polyol compound. This polyol compound is a polymeric compound having two or more hydroxyl groups, e.g., a diol or triol compound. Examples of such the polyol compounds include polycarbonate polyols, polyester polyols, polyether polyols, and polysiloxane polyols. Such the polyol compounds preferably have a molecular weight of from 500 to 2,000, in order that the polyurethane dispersion described later, which is obtained using the urethane prepolymer according to the present invention, can more readily attain desired properties.

The structural unit $U_3$ derived from any of such the polyol compounds has a chain structure formed by removing at least two hydroxyl groups from the polyol compound. Examples of the chain structure include polycarbonate chains, polyester chains, polyether chains, and polysiloxane chains.

In the case where two or more structural units $U_3$ are contained in the urethane prepolymer of the present invention, these structural units $U_3$ may be of two or more kinds.

The above-described structural units $U_1$, $U_2$, and $U_3$ are bonded to each other by a urethane bond so as to satisfy the following requirements.

Requirement 1: Structural units $U_1$ and $U_1$, $U_3$ and $U_3$, and $U_1$ and $U_3$ each are located to each other through a structural unit $U_2$.

Requirement 2: The structural unit located at each of molecular ends is a structural unit $U_2$.

Requirement 3: The structural unit $U_2$ located at each molecular end has an isocyanate group bonded to the end of the unit.

The urethane prepolymer of the present invention which satisfies the above requirements can be schematically shown, for example, by the following four formulae.

The weight-average molecular weight of the urethane prepolymer of the present invention is desirably from 1,500 to 30,000, preferably from 3,000 to 10,000. If the weight-average molecular weight of the urethane prepolymer of the present invention is lower than 1,500, there are cases where the polyurethane dispersion described later, which is obtained from the urethane prepolymer, gives a film having reduced performances. On the other hand, if the weight-average molecular weight thereof exceeds 30,000, emulsification is difficult and the polyurethane dispersion described later has reduced stability. Weight-average molecular weight can be determined, for example, by gel permeation chromatography (GPC).

The acid value of the urethane prepolymer of the present invention is desirably from 10 to 100, preferably from 20 to 80. If the acid value thereof is lower than 10, emulsification is difficult and the polyurethane dispersion described later has reduced stability. On the other hand, if the acid value

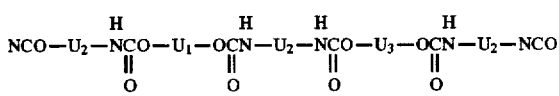
(1)

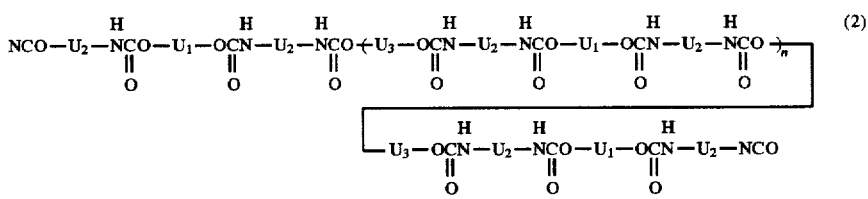
(2)

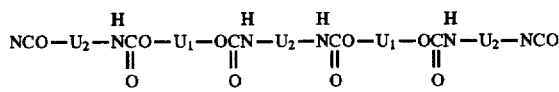
(3)

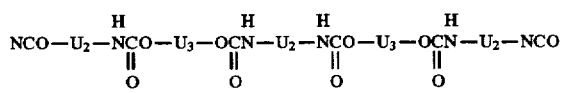
(4)

In No. (2) among the urethane prepolymer represented by the above four formulae, a structural unit $U_1$ and a structural unit $U_3$ are alternately arranged through a structural unit $U_2$, but in the urethane prepolymer according the present invention, a structural unit $U_1$ and a structural unit $U_1$ may be adjacently arranged through a structural unit $U_2$, or a structural unit $U_3$ and a structural unit $U_3$ may be adjacently arranged through a structural unit $U_2$.

Although examples of the urethane prepolymer shown by these formulae are linear, the urethane prepolymer of the present invention can have a branched structure when the structural unit $U_2$ is a branched hydrocarbon group, or when the structural unit $U_3$ is derived from a polyol having 3 or more hydroxyl groups.

For ease of production, etc., the urethane prepolymer according to the present invention preferably satisfies the following: $R^2$ and $R^3$ contained in structural unit $U_1$ each is an alkylene group having one bonding site for another structural unit, i.e., structural unit $U_2$; structural unit $U_2$ is an aliphatic hydrocarbon group; and structural unit $U_3$ comprises at least one member selected from the group consisting of polycarbonate chains, polyester chains, polyether chains, and polysiloxane chains.

Such a preferred urethane prepolymer most desirably has a structure in which X contained in structural unit $U_1$ is $-SO_3^-$, structural unit $U_2$ is the aliphatic hydrocarbon group represented by formula (2) given hereinabove, and structural unit $U_3$ is a polycarbonate chain.

thereof exceeds 100, the polyurethane dispersion described later gives a film having reduced water resistance. Acid value herein means the number of milligrams of potassium hydroxide equivalent to the anionic groups present in 1 g of the urethane prepolymer of the present invention, and can be usually determined by titration.

Processes for Producing Urethane Prepolymer

The urethane prepolymer described above according to the present invention can be produced by the following three processes.

(Process 1)

[Step 1]

First, a first polyol compound having an anionic group and a cationic group in the molecule is reacted with a polyisocyanate compound. The first polyol compound used here has any of the above-mentioned anionic groups and any of the above-mentioned cationic groups and further has at least two (preferably two or three) hydroxyl groups. Examples of the first polyol having two hydroxyl groups include polyols represented by formula (5) or (6).

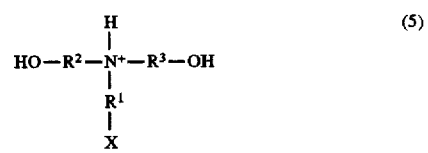
(5)

-continued

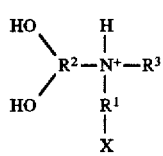
(6)

In formulae (5) and (6), $R^1$ is an alkylene group having 1 or 2 carbon atoms. $R^2$ is an alkylene group having 2 to 4 carbon atoms. $R^3$ in formula (5) is an alkylene group having 2 to 4 carbon atoms, and $R^3$ in formula (6) is a hydrogen atom or an alkyl group having 1 to 12 carbon atoms. X is an anionic group, specifically such as $—SO_3^{31}$, $—PO_3^-$, or $—COO^-$.

Specific examples of the first polyol compound include N,N-bis(2-hydroxyethyl)taurine, N,N-bis(2-hydroxyethyl) aminomethylsulfonic acid, N,N-bis(2-hydroxybutyl) aminoethylsulfonic acid, (1,2-dihydroxypropyl) methylaminoethylsulfonic acid, (1,2-dihydroxypropyl) dodecylaminoethylsulfonic acid, N,N-bis(2-hydroxyethyl) aminoethylcarboxylic acid, and N,N-bis(2-hydroxyethyl) aminoethylphosphoric acid.

On the other hand, the polyisocyanate compound has 4 to 13 carbon atoms and two or more (preferably two) isocyanate groups. Specific examples thereof include polyisocyanate compounds generally used for polyurethane production, e.g., aromatic diisocyanates such as 2,4-tolylene diisocyanate, 2,6-tolylene diisocyanate, 4,4'-diphenylmethane diisocyanate, m-phenylene diisocyanate, and xylylene diisocyanate; and aliphatic diisocyanates such as tetramethylene diisocyanate, hexamethylene diisocyanate, 1,4-cyclohexylene diisocyanate, 4,4'-dicyclohexylmethane diisocyanate, isophorone diisocyanate, and tetramethylxylylene diisocyanate. In the present specification, aliphatic isocyanates and aromatic isocyanates are distinguished from each other in the same manner as described hereinabove with regard to structural unit $U_2$, except that each "urethane bond" is replaced with an "isocyanate group."

In reacting the first polyol compound with the polyisocyanate compound, these ingredients are used in such a proportion that the amount of the polyisocyanate compound is at least two equivalents, preferably two equivalents, to the first polyol compound. If the ingredients are reacted in a proportion outside that range, it is difficult to obtain an isocyanate compound having an isocyanate group at each of molecular ends thereof as described later.

A solvent is used for the reaction of the two ingredients. The solvent is desirably one which itself does not react with an isocyanate group and in which the first polyol compound can be dissolved, and is preferably one having a boiling point of 100° C. or higher. Examples of such the solvents include dimethyl sulfoxide, diglyme, N-methyl-2-pyrrolidone, N-methylformanilide, 1,3-dimethyl-3,4,5,6-tetrahydro-2(H)-pyrimidinone, and 1,3-dimethyl-2-imidazolidinone. A solvent is preferably used in such an amount that the total amount of the polyisocyanate compound and the first polyol compound is from 60 to 70% by weight of the solvent amount.

A catalyst may be used for the reaction. A tertiary amine or tin compound for use in ordinary urethane-forming reactions is used as the catalyst.

In carrying out the reaction, a first polyol compound is first added to a solvent, and the mixture is heated until the polyol compound completely dissolves or melts. A polyisocyanate compound is then added thereto while holding the solution at a temperature at which the first polyol compound does not precipitate. Whether or not the reaction has been completed can be judged by determining the isocyanate equivalent. As a result of the above procedure, the first polyol compound and the polyisocyanate compound undergo a urethane-forming reaction to give an isocyanate compound having at each of molecular ends thereof an isocyanate group derived from the polyisocyanate compound. This isocyanate compound is represented by formula (3).

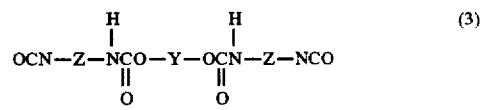
(3)

In formula (3), Y is a structural unit represented by formula (4), which unit corresponds to the first polyol compound from which the hydroxyl groups which participated in the urethane-forming reaction have been removed.

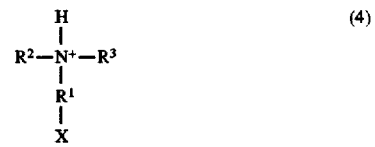
(4)

In formula (4), $R^1$ represents an alkylene group having 1 or 2 carbon atoms. $R^2$ represents an alkylene group having 2 to 4 carbon atoms and having either a bonding site for one of the two urethane-bonding parts contained in formula (3) or both the bonding sites for the two urethane-bonding parts contained in formula (3). $R^3$ represents an alkylene group having 2 to 4 carbon atoms and a bonding site for one of the two urethane-bonding parts when $R^2$ has a bonding site for the other urethane-bonding part, and represents a hydrogen atom or an alkyl group having 1 to 12 carbon atoms when $R^2$ is an alkylene group having both bonding sites for the two urethane-bonding parts. Further, X is an anionic group, specifically such as $—SO_3^-$, $—PO_3^-$, or $—COO^-$.

In formula (3), Z represents a hydrocarbon group having 4 to 13 carbon atoms, which corresponds to the polyisocyanate compound from which the isocyanate groups which participated in the urethane-forming reaction have been removed.

[Step 2]

Subsequently, the isocyanate compound obtained in step 1 is reacted with a second polyol compound. Before being used in this reaction, the isocyanate compound obtained by the reaction of step 1 may be or may not be isolated from the reaction mixture resulting from step 1.

The second polyol compound used here differs from the first polyol compound described above, and is selected from polyol compounds widely used for polyurethane production. Examples thereof include polyethers such as polyethylene glycol, polypropylene glycol, and polytetramethylene glycol; polyesters obtained by the dehydrating condensation reaction of polyhydric alcohols (e.g., ethylene glycol, propylene glycol, butanediol, hexanediol, neopentyl glycol, and cyclohexyldimethanol) with polycarboxylic acids (e.g., maleic acid, succinic acid, adipic acid, and phthalic acid), or obtained by the ring-opening polymerization reaction of cyclic esters; polymeric diols such as polycarbonate diols; low-molecular glycols such as ethylene glycol, diethylene glycol, triethylene glycol, 1,2-propylene glycol, trimethylene glycol, 1,3-butylene glycol, tetramethylene glycol, hexamethylene glycol, hydrogenated bisphenol A, and ethylene oxide adducts or propylene oxide adducts of bisphenol A; and polysiloxane diols. The second polyol compound may be a mixture of any of the above-mentioned diols with a polyol having three or more hydroxyl groups, e.g., a triol.

In reacting the isocyanate compound obtained by step 1 with the second polyol compound, these ingredients are reacted in such a proportion that the amount of the second polyol compound is less than equivalent to the isocyanate compound. If the amount of the second polyol compound is more than equivalent to the isocyanate compound, a hydroxyl-terminated polymer is formed and thereby the intended urethane prepolymer cannot be obtained. The proportion by equivalent herein means the proportion between the amount by equivalent of the isocyanate groups contained in the isocyanate compound and the amount by equivalent of the hydroxyl groups contained in the second polyol compound. The proportion by equivalent is desirably such that the isocyanate group/hydroxyl group ratio is preferably from 1.1 to 3.0, more preferably from 1.5 to 2.0.

The reaction in this step is a urethane-forming reaction, which can be carried out according to the procedure for an ordinary urethane-forming reaction. The end point of the reaction can be judged by determining the isocyanate equivalent. As a result of this reaction, a polymer having at each of molecular ends thereof an isocyanate group derived from the isocyanate compound obtained in step 1 is obtained as the intended urethane prepolymer.

(Process 2)

In this process, the same reaction as in step 2 in the above-described process 1 is conducted, except that the ingredients are reacted in such a proportion that the amount of the second polyol compound is larger than equivalent to the isocyanate compound. The proportion by equivalent is desirably such that the isocyanate group/hydroxyl group ratio is preferably from 0.3 to 0.9, more preferably from 0.5 to 0.7. Thus, a first polymer compound having at each of molecular ends thereof a hydroxyl group derived from the second polyol compound is obtained.

Subsequently, the first polymer compound obtained is reacted with a polyisocyanate compound. In this step, the terminal hydroxyl groups of the first polymer compound undergo a urethane-forming reaction with isocyanate groups of the polyisocyanate compound. As a result, a second polymer compound having at each of molecular ends thereof an isocyanate group derived from the polyisocyanate compound is obtained as the intended urethane prepolymer.

The polyisocyanate compound for use in this step is the same as the polyisocyanate compound used in step 1 in the above-described process 1. The amount of the polyisocyanate compound used for this reaction is at least two equivalents to the first polymer compound. If the polyisocyanate compound is used in a proportion smaller than the lower limit, the reaction product contains residual terminal hydroxyl groups derived from the first polymer compound and thereby it is difficult to obtain the intended urethane polymer.

(Process 3)

In this process, a polyol compound is reacted with a polyisocyanate compound so as to result in a reaction product having an isocyanate group at each of molecular ends thereof.

For example, the polyol compound used here is a mixture of the first polyol compound used in the above-described process 1, i.e., an amphoteric polyol compound having an anionic group and a cationic group in the molecule, with the second polyol compound used in the above-described process 1. The proportion of the first polyol compound (amphoteric polyol compound) to the second polyol compound is preferably from 1:0.2 to 1:20 by weight.

On the other hand, the polyisocyanate compound used in this process is the same as the polyisocyanate compound used in the processes described above.

In order for this process to yield a reaction product having an isocyanate group at each of molecular ends thereof, the polyol compound and the polyisocyanate compound are reacted in such a proportion that the amount of the polyisocyanate compound is larger than equivalent to the polyol compound. The proportion by equivalent is desirably such that the isocyanate group/hydroxyl group ratio is preferably from 1.1 to 3.0, more preferably from 1.5 to 2.0, as in step 2 in the above-described process 1. If the two compounds are used in a proportion outside the above range, a hydroxyl-terminated polymer is formed and thereby the intended urethane polymer cannot be obtained.

Of processes 1, 2, and 3 described above, processes 1 and 2 are preferred because these processes yield by-products with difficulty.

Applications

Since the urethane prepolymer of the present invention has both anionic groups and cationic groups, the prepolymer itself can be utilized as an emulsifying agent. It can also be used as a material for producing the polyurethane dispersion described below.

Polyurethane Dispersion

The polyurethane dispersion according to the present invention is produced from the above-described urethane prepolymer according to the present invention.

In producing the polyurethane dispersion, the urethane prepolymer of the present invention is reacted with a chain extender in water. This reaction may be carried out by a conventional method generally employed for the production of polyurethane dispersions from urethane prepolymers and chain extenders.

A compound having two or more amino groups in the molecule is used as the chain extender. Examples of this compound include hydrazine compounds, diamine compounds, triamine compounds and tetramine compounds. Specific examples of the diamine compounds include ethylenediamine, propylenediamine, and hexamethylenediamine. Specific examples of the triamine compounds include diethylenetriamine. Specific examples of the tetramine compounds include triethylenetetramine.

The mixing ratio of the urethane prepolymer to the chain extender is preferably from 1/0.5 to 1/2.5 by equivalent. If the proportion by equivalent is outside the above range, the resin obtained cannot have a high molecular weight and hence tends to give a film which does not have desired properties. The proportion by equivalent herein means the ratio of the amount by equivalent of the isocyanate groups contained in the urethane prepolymer to the amount by equivalent of the amino groups contained in the chain extender.

The amount of the water used for the reaction can be suitably decided according to the solid content of the polyurethane dispersion to be produced.

The polyurethane dispersion of the present invention thus produced has satisfactory dispersion stability even without use of an emulsifying agent or a neutralizing agent, e.g., an amine, because the urethane prepolymer used as a starting material contains both anionic groups and cationic groups. It is, of course, possible to enhance the dispersion stability by neutralizing the anionic groups with, e.g., an amine or by using an emulsifying agent.

The polyurethane dispersion of the present invention can be used as a paint for, e.g., the exterior paint of buildings. Since the polyurethane dispersion was produced from the urethane prepolymer described above, the coating film obtained therefrom has satisfactory acid and alkali resistance as well as the film performances attainable with prior art polyurethane dispersions. In addition, the film obtained from the polyurethane dispersion of the present invention has satisfactory non-yellowing properties in weathering.

EXAMPLE

The present invention will be explained below in more detail by reference to the following Examples, but the invention should not be construed as being limited thereto.

Example 1

(Synthesis of Urethane Prepolymer)

A four-necked round-bottom separable flask having a capacity of 300 ml and equipped with a stirrer, thermometer, condenser, and glass tube for introducing nitrogen gas was used as a reactor. Into this reactor were introduced 42.7 g of N,N-bis(2-hydroxyethyl)taurine, 133.4 g of isophorone diisocyanate (2 mol per mol of the N,N-bis(2-hydroxyethyl) taurine), and 40 wt % 1-methyl-2-pyrrolidone (115.7 g). The contents were heated to about 160° C. with an oil bath while passing nitrogen gas through the reactor and stirring the contents.

After complete melting of the N,N-bis(2-hydroxyethyl) taurine was ascertained, the solution was cooled to about 80° C. over a period of 2 hours. Thereto was added dropwise di-n-butyltin dilaurate (0.06 wt % solid). The resulting mixture was stired for 30 minutes to obtain a clear diisocyanate compound. This reaction is shown by the following reaction equation, in which the thus-obtained diisocyanate compound is represented by formula (7).

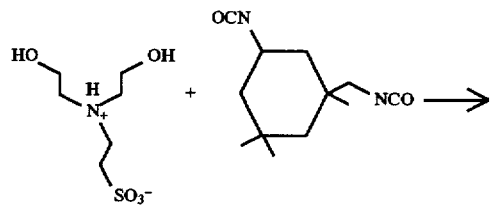
(7)

Figure 2:
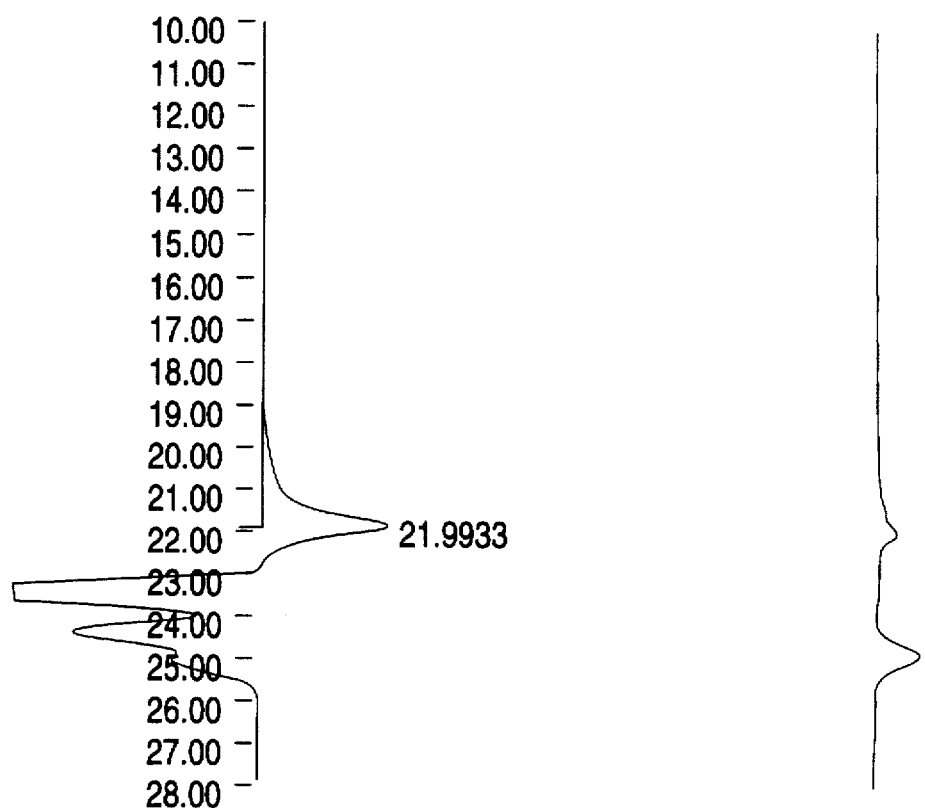
FIG. 2 is a GPC chart of the diisocyanate compound obtained in Example 1.

FIGS. 1 and 2 are respectively shown an infrared absorption spectrum (obtained with Fourier transform infrared spectrophotometer, "Type FT/IR-5300", manufactured by Jasco Co.) of the diisocyanate compound obtained and the results of a measurement of the average molecular weight thereof (obtained with GPC System II, manufactured by Shodex Co.; column conditions, KF-80M→KF-803; carrier solvent, THF; temperature for measurement, 40° C.; GPC chart obtained by a value converted with polystyrene). The diisocyanate compound was further examined for isocyanate equivalent by back titration with dibutylamine. As a result, the isocyanate equivalent of the compound was found to be 382 (calculated value, 329).

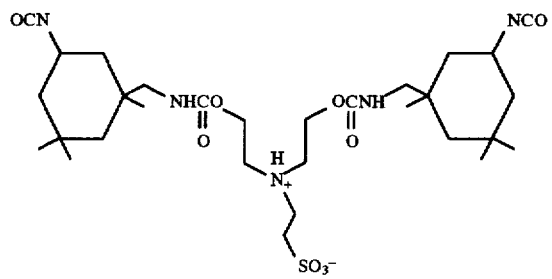

To the diisocyanate compound obtained was added 15.0 g of a polycarbonate diol having a molecular weight of 500 ("Placcel CD Soft Type", manufactured by Daicel Chemical Industries, Ltd., Japan). The mixture was stirred at about 80° C. for 30 minutes while passing nitrogen gas through the reactor. Thereto was further added 56.0 g of a polycarbonate diol having a molecular weight of 800 ("Placcel CD Soft Type", manufactured by Daicel Chemical Industries, Ltd.). This mixture was stirred for 3.5 hours under the same conditions to obtain a polymer containing terminal hydroxyl groups remaining unreacted. In order to completely replace the unreacted terminal hydroxyl groups with isocyanate groups, isophorone diisocyanate was added in an amount 0.5 times by mol the amount thereof used above. The resulting mixture was stirred at 80° C. for 4 hours. Thus, a urethane prepolymer was obtained as the target compound. This reaction is shown by the following reaction equation, in which the urethane prepolymer obtained is represented by formula (8).

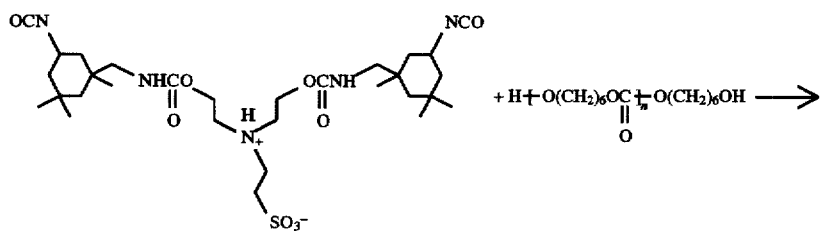
(8)

-continued

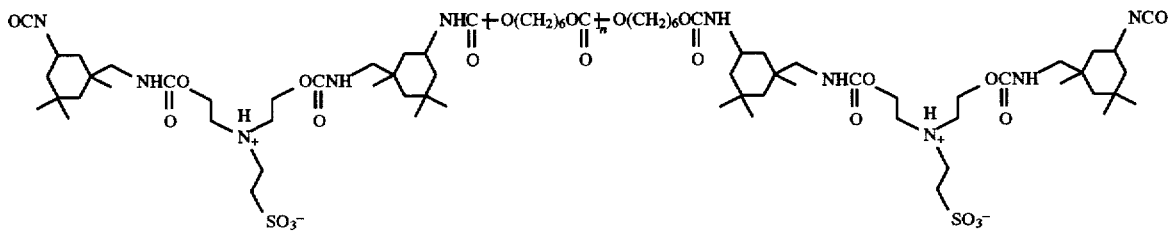

Figure 3:
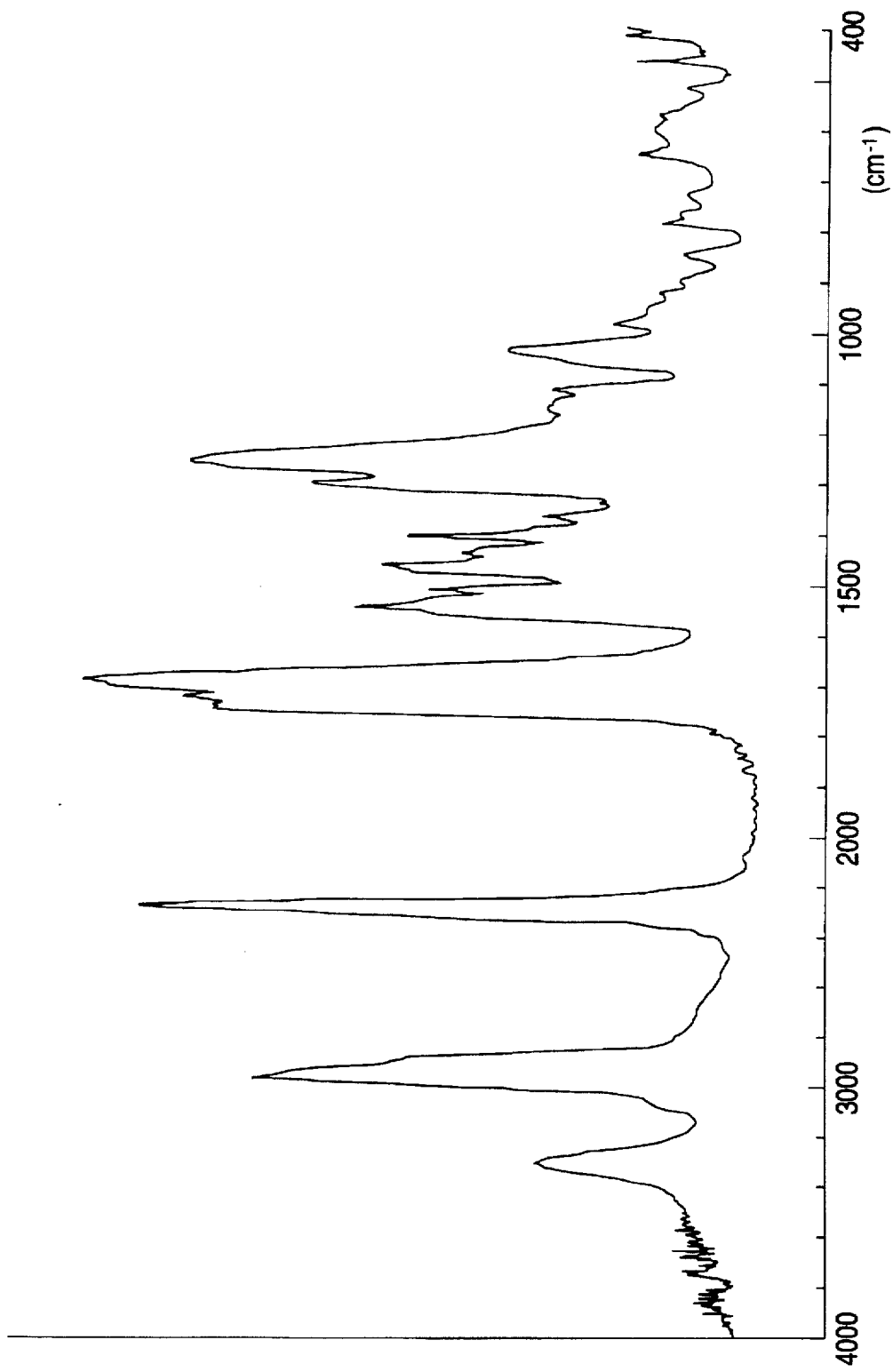
FIG. 3 is an infrared absorption spectrum of the urethane prepolymer obtained in Example 1.
Figure 4:
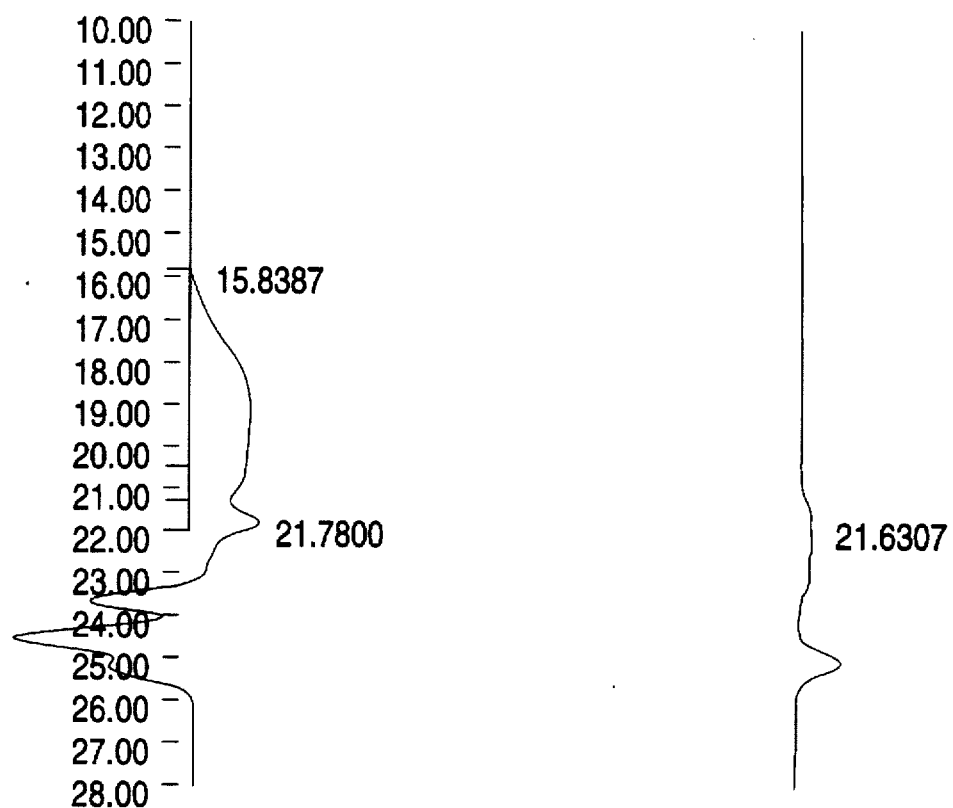
FIG. 4 is a GPC chart of the urethane prepolymer obtained in Example 1.

The urethane prepolymer obtained was subjected to IR spectrochemical analysis and a measurement of average molecular weight in the same manner as described above. The results obtained are shown in FIGS. 3 and 4. Further, the isocyanate equivalent of the urethane prepolymer was determined in the same manner as described above, and was found to be 1,380 (calculated value, 1,013).

Example 2

(Production of Polyurethane Dispersion)

A urethane prepolymer was obtained in the same manner as in Example 1, except that the amounts of N,N-bis(2-hydroxyethyl)taurine and isophorone diisocyanate were changed to 7.6 g and 52 g, respectively, and that di-n-butyltin dilaurate was not added.

The urethane prepolymer solution obtained was cooled to 50° C. or lower, and 5.9 g of hydrazine monohydrate and 180 g of distilled water were added. This mixture was emulsified to obtain a polyurethane dispersion.

Example 3

(Production of Polyurethane Dispersion)

A four-necked round-bottom separable flask having a capacity of 1 liter and equipped with a stirrer, thermometer, condenser, and glass tube for introducing nitrogen gas was used as a reactor. Into this reactor were introduced 21 g of N,N-bis(2-hydroxyethyl)taurine, 45 g of isophorone diisocyanate, and 40 wt % 1-methyl-2-pyrrolidone (44 g). The contents were heated to about 160° C. with an oil bath while passing nitrogen gas through the reactor and stirring the contents.

After complete melting of the N,N-bis(2-hydroxyethyl) taurine was ascertained, the solution was cooled to about 80° C. over a period of 2 hours. Thereto was added dropwise di-n-butyltin dilaurate (0.06 wt % solid). The resulting mixture was stirred for 30 minutes to obtain a clear diisocyanate compound.

To the diisocyanate compound obtained were added 120 g of a polycarbonate diol having a molecular weight of 800 ("Placcel CD-208PL", manufactured by Daicel Chemical Industries, Ltd.) and 50 g of a polycarbonate diol having a molecular weight of 1,000 ("Placcel CD-210PL", manufactured by Daicel Chemical Industries, Ltd.) together with 113 g of 1-methyl-2-pyrrolidone. This mixture was stirred at about 80° C. for 4 hours while passing nitrogen gas through the reactor. Thus, a polymer containing terminal hydroxyl groups remaining unreacted was obtained. In order to completely replace the terminal hydroxyl groups with isocyanate groups, isophorone diisocyanate was added in the same molar amount as the above (45 g). The resulting mixture was stirred at 80° C. for 4 hours to obtain a urethane prepolymer.

The urethane prepolymer solution obtained was cooled to 50° C. or lower and then neutralized with 10 g of triethylamine. Thereafter, 5 g of hydrazine monohydrate and 500 g of distilled water were added, and the resulting mixture was emulsified to obtain Polyurethane Dispersion, U-1.

Example 4

(Production of Polyurethane Dispersion)

Polyurethane Dispersion, U-2, was obtained in the same manner as in Example 3, except that the urethane prepolymer was not neutralized.

Example 5

(Production of Polyurethane Dispersion)

Into the same reactor as in Example 3 were introduced 43 g of N,N-bis(2-hydroxyethyl)taurine, 89 g of isophorone diisocyanate, and 40 wt % 1-methyl-2-pyrrolidone (88 g). The contents were heated to about 160° C. with an oil bath while passing nitrogen gas through the reactor and stirring the contents.

After complete melting of the N,N-bis(2-hydroxyethyl) taurine was ascertained, the solution was cooled to about 80° C. over a period of 2 hours. Thereto was added dropwise di-n-butyltin dilaurate (0.06 wt %/solid). The resulting mixture was stirred for 30 minutes to obtain a clear diisocyanate compound.

To the diisocyanate compound obtained were added 4 g of a polycarbonate diol having a molecular weight of 800 ("Placcel CD-208PL", manufactured by Daicel Chemical Industries, Ltd.) and 145 g of a polycarbonate diol having a molecular weight of 1,000 ("Placcel CD-210PL", manufactured by Daicel Chemical Industries, Ltd.) together with 99 g of 1-methyl-2-pyrrolidone. This mixture was stirred at about 80° C. for 4 hours while passing nitrogen gas through the reactor. Thus, a urethane prepolymer was obtained.

The urethane prepolymer solution obtained was cooled to 50° C. or lower, and 2.5 g of hydrazine monohydrate and 470 g of distilled water were added. This mixture was emulsified to obtain Polyurethane Dispersion, U-3.

Example 6

(Production of Polyurethane Dispersion)

Into the same reactor as in Example 3 were introduced 35 g of N,N-bis(2-hydroxyethyl)aminoethylcarboxylic acid, 89 g of isophorone diisocyanate, and 40 wt % 1-methyl-2-pyrrolidone (83 g). The contents were heated to about 110° C. with an oil bath while passing nitrogen gas through the reactor and stirring the contents.

After complete melting of the N,N-bis(2-hydroxyethyl) aminoethylcarboxylic acid was ascertained, the solution was cooled to about 80° C. over a period of 2 hours. Thereto was added dropwise di-n-butyltin dilaurate (0.06 wt %/solid). The resulting mixture was stirred for 30 minutes to obtain a clear diisocyanate compound.

To the diisocyanate compound obtained were added 113 g of a polycarbonate diol having a molecular weight of 1,000 ("Placcel CD-210PL", manufactured by Daicel Chemical Industries, Ltd.) and 40 g of a polycarbonate diol having a molecular weight of 2,000 ("Placcel CD-220PL", manufactured by Daicel Chemical Industries, Ltd.) together with 102 g of 1-methyl-2-pyrrolidone. This mixture was stirred at about 80° C. for 4 hours while passing nitrogen gas through the reactor. Thus, a urethane prepolymer was obtained.

The urethane prepolymer solution obtained was cooled to 50° C. or lower, and 3.3 g of hydrazine monohydrate and 470 g of distilled water were added. This mixture was emulsified to obtain Polyurethane Dispersion, U-4.

Example 7

(Production of Polyurethane Dispersion)

Polyurethane Dispersion, U-5, was obtained in the same manner as in Example 5, except that 3.9 g of ethylenediamine monohydrate was used in the final step in place of the hydrazine monohydrate.

Example 8

(Production of Polyurethane Dispersion)

Into the same reactor as in Example 3 were introduced 43 g of N,N-bis(2-hydroxyethyl)taurine, 89 g of isophorone diisocyanate, 4 g of a polycarbonate diol having a molecular weight of 800 ("Placcel CD-208PL", manufactured by Daicel Chemical Industries, Ltd.), 145 g of a polycarbonate diol having a molecular weight of 1,000 ("Placcel CD-210PL", manufactured by Daicel Chemical Industries, Ltd.) and 187 g of 1-methyl-2-pyrrolidone. The contents were heated to about 160° C. with an oil bath while passing nitrogen gas through the reactor and stirring the contents.

After complete melting of the N,N-bis(2-hydroxyethyl)taurine was ascertained, the solution was cooled to about 80° C. over a period of 2 hours. Thereto was added dropwise di-n-butyltin dilaurate (0.06 wt %/solid). The resulting mixture was stirred for 4 hours to obtain a urethane prepolymer.

The urethane prepolymer solution obtained was cooled to 50° C. or lower, and 2.5 g of hydrazine monohydrate and 470 g of distilled water were added. This mixture was emulsified to obtain Polyurethane Dispersion.

Comparative Example 1

Into the same reactor as in Example 3 were introduced 4.8 g of dimethylolpropionic acid, 40 g of isophorone diisocyanate, 55 g of a polycarbonate diol ("Placcel CD-210PL", manufactured by Daicel Chemical Industries, Ltd.; molecular weight: 1,000), and 67 g of N-methyl-2-pyrrolidone. A urethane-forming reaction was conducted at 75° to 80° C. for 5 hours to obtain a urethane prepolymer. After this urethane prepolymer was cooled to 50° C. or lower, 3.6 g of triethylamine was added thereto to neutralize the same. Thereto were then added 4.5 g of hydrazine monohydrate and 176 g of distilled water. Thus, a polyurethane dispersion was obtained.

Comparative Example 2

(Production of Polyurethane Dispersion)

Into 40 g of N-methyl-2-pyrrolidone was dissolved 42 g of polyethylene glycol monoether (molecular weight: 750). To this solution was added dropwise 13 g of isophorone diisocyanate at 50° C. over a period of 30 minutes. This reaction system was then cooled to 30° C. or lower, and 5.3 g of diethanolamine was added to obtain a diol having a poly(ethylene oxide) chain.

Into the same reactor as in Example 2 were introduced 60 g of the diol obtained above, 72 g of a polycarbonate diol ("Placcel CD-210PL", manufactured by Daicel Chemical Industries, Ltd.; molecular weight: 1,000), 47 g of isophorone diisocyanate, and 79 g of N-methyl-2-pyrrolidone. A urethane-forming reaction was conducted at 75° to 80° C. for 5 hours to obtain a urethane prepolymer. After this urethane prepolymer was cooled to 50° C. or lower, 5.3 g of hydrazine monohydrate and 271 g of distilled water were added thereto to obtain a polyurethane dispersion.

Evaluation

Each of the polyurethane dispersions obtained in Examples 2 to 8 and Comparative Examples 1 and 2 was applied to a substrate, and was dried at room temperature for 3 days to form a coating film.

The films obtained were examined for appearance, water resistance, solvent resistance, acid resistance, alkali resistance, and non-yellowing property in weathering. The evaluation methods used are as follows. The results obtained are shown in Table 1.

(Appearance)

The appearance of each the film was visually judged.

⊚: excellent.

○: good.

(Water Resistance)

Each coated substrate was immersed in 40° C. warm water for 1 day, and the appearance of the film was examined immediately thereafter.

⊚: no problem.

○: slight blushing.

x: blushing.

(Solvent Resistance)

Each the film was rubbed with xylene 50 times, and the appearance of the film was examined thereafter and evaluated based on the same criteria as for water resistance.

(Acid Resistance)

Using 5% sulfuric acid as an acid solution, the films were evaluated in accordance with JIS-K-5400.

(Alkali Resistance)

Using a 5% aqueous sodium hydroxide solution as an alkali solution, the films were evaluated according to JIS-K-5400.

(Non-yellowing Property in Weathering)

After QUV 200 hours, each film was examined with a color difference meter to determine the average values of ΔE and Δb, based on which the non-yellowing properties thereof were evaluated.

TABLE 1

|  | Example | | | | | | Comparative Example | |
|---|---|---|---|---|---|---|---|---|
|  | 2 | 3 | 4 | 5 | 6 | 7 | 1 | 2 |
| Ionicity | amphoteric | amphoteric | amphoteric | amphoteric | amphoteric | amphoteric | anionic | nonionic |
| Kind of hydrophilic group(*) | A | A | A | A | B | A | C | D |
| Acid value | 20 | 20 | 20 | 40 | 40 | 40 | 20 | 0 |
| Appearance | ⊚ | ⊚ | ⊚ | ○ | ○ | ⊚ | ⊚ | ○ |
| Water resistance | ⊚ | ⊚ | ⊚ | ○ | ⊚ | ⊚ | ⊚ | x |
| Solvent resistance | ⊚ | ⊚ | ⊚ | ○ | ⊚ | ⊚ | ⊚ | x |
| Acid resistance | no problem | no problem | no problem | no problem | no problem | no problem | no problem | discoloration |
| Alkali resistance | no problem | no problem | no problem | no problem | no problem | no problem | blistering | discoloration |
| Non-yellowing property in weathering |  |  |  |  |  |  |  |  |
| ΔE | 1.78 | 1.58 | 2.26 | 2.63 | 1.92 | 2.10 | 4.92 | 2.74 |
| Δb | 0.95 | 0.81 | 0.86 | 1.89 | 1.05 | 1.13 | 4.57 | 2.13 |

* A: sulfonic acid/ammonium  B: carboxylic acid/ammonium  C: carboxylic acid  D: ethylene oxide Since the urethane prepolymer according to the present invention has both at least one anionic group and at least one cationic group in the molecule, it can be used to produce a polyurethane dispersion which is capable of forming a coating film having high acid and alkali resistance and has satisfactory dispersion stability.

According to the process of the present invention for urethane prepolymer production, a urethane prepolymer having both at least one anionic group and at least one cationic group in the molecule can be produced in which the prepolymer can be used to produce a polyurethane dispersion which is capable of forming a coating film having high acid and alkali resistance and has satisfactory dispersion stability.

By use of the isocyanate compound according to the present invention, a urethane prepolymer having both at least one anionic group and at least one cationic group in the molecule can be produced.

Since the polyurethane dispersion according to the present invention is produced from the urethane prepolymer having both at least one anionic group and at least one cationic group in the molecule, it has satisfactory dispersion stability and is capable of forming a coating film having high acid and alkali resistance. The film also has satisfactory non-yellowing properties in weathering.

While the invention has been described in detail and with reference to specific embodiments thereof, it will be apparent to one skilled in the art that various changes and modifications can be made therein without departing from the spirit and scope thereof.

What is claimed is:

1. A polyurethane dispersion obtained by a process comprising the step of reacting a urethane prepolymer having both at least one anionic group and at least one cationic group in the molecule and having an isocyanate group at each of molecular ends thereof with a chain extender in water.

2. The polyurethane dispersion as claimed in claim 1, wherein said urethane prepolymer comprises:

one or more structural units $U_1$ each having both an anionic group and a cationic group and represented by formula (1), structural units $U_2$ each comprising a hydrocarbon group having 4 to 13 carbon atoms, and one or more structural units $U_3$ each having a chain structure corresponding to that formed by removing at least two hydroxyl groups from a polyol compound, the structural units $U_1$, $U_2$, and $U_3$ being bonded to each other by a urethane bond in such a manner that each structural unit $U_1$ is bonded to a structural unit $U_1$ or $U_3$ through a structural unit $U_2$ and each structural unit $U_3$ is bonded to a structural unit $U_3$ or $U_1$ through a structural unit $U_2$, and that each terminal unit is a structural unit $U_2$ having an isocyanate group bonded at the end thereof;

(1)

wherein $R^1$ represents an alkylene group having 1 or 2 carbon atoms, $R^2$ represents an alkylene group having 2 to 4 carbon atoms and having either one bonding site for a structural unit $U_2$ or two bonding sites for structural units $U_2$, $R^3$ represents an alkylene group having 2 to 4 carbon atoms when $R^2$ is an alkylene group having one bonding site for a structural unit $U_2$, and represents a hydrogen atom or an alkyl group having 1 to 12 carbon atoms when $R^2$ is an alkylene group having two bonding sites for structural units $U_2$, and X represents $—SO_3^-$, $—PO_3^-$, or $—COO^-$.

3. The polyurethane dispersion as claimed om claim 2, wherein $R^2$ and $R^3$ contained in the structural units $U_1$ each is an alkylene group having 2 to 4 carbon atoms and one bonding site for a structural unit $U_2$, the structural units $U_2$ each is an aliphatic hydrocarbon group, and the structural units $U_3$ each is at least one polymer chain selected from the group consisting of polycarbonate chains, polyester chains, polyether chains, and polysiloxane chains.

4. The polyurethane dispersion as claimed in claim 3, wherein

X contained in the structural units $U_1$ is $—SO_3^-$, the structural units $U_2$ each is the aliphatic hydrocarbon group represented by formula (2):

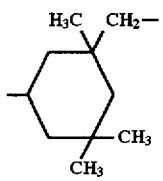 (2)

and the structural units $U_3$ each is a polycarbonate chain.

5. The polyurethane dispersion as claimed in claim 1, wherein said polyurethane prepolymer has a weight-average molecular weight of from 1,500 to 30,000 and an acid value of from 10 to 100.

6. The polyurethane dispersion as claimed in claim 2, wherein said polyurethane prepolymer has a weight-average molecular weight of from 1,500 to 30,000 and an acid value of from 10 to 100.

7. The polyurethane dispersion as claimed in claim 1, wherein said urethane prepolymer is prepared by a process which comprises the steps of:

(a) reacting a first polyol compound having an anionic group and a cationic group in the molecule with a polyisocyanate compound, the amount of the polyisocyanate compound being at least two equivalents to the first polyol compound, to obtain an isocyanate compound having at each of molecular ends thereof an isocyanate group derived from the polyisocyanate compound; and (b) reacting the isocyanate compound with a second polyol compound, the amount of the second polyol compound being less than equivalent to the isocyanate compound, to obtain a polymer compound having at each of molecular ends thereof an isocyanate group derived from the isocyanate compound.

8. The polyurethane dispersion as claimed in claim 1, wherein said urethane prepolymer is prepared by a process which comprises the steps of:

(a) reacting a first polyol compound having an anionic group and a cationic group in the molecule with a polyisocyanate compound, the amount of the polyisocyanate compound being at least two equivalents to the first polyol compound, to obtain an isocyanate compound having at each of molecular ends thereof an isocyanate group derived from the polyisocyanate compound;

(b) reacting the isocyanate compound with a second polyol compound, the amount of the second polyol compound being more than equivalent to the isocyanate compound, to obtain a first polymer compound having at each of molecular ends thereof a hydroxyl group derived from the second polyol compound; and (c) reacting the first polymer compound with a polyisocyanate compound, the amount of the polyisocyanate compound being at least two equivalents to the first polymer compound, to obtain a second polymer compound having at each of molecular ends thereof an isocyanate group derived from the polyisocyanate compound.

9. The polyurethane dispersion as claimed in claim 1, wherein said urethane prepolymer is prepared by a process which comprises the step of reacting a polyol compound and a polyisocyanate compound so that the isocyanate group is located at the plural ends of the product thereof, wherein the polyol compound includes an amphoteric polyol compound having an anionic group and a cationic group in the molecule.

10. The polyurethane dispersion as claimed in claim 7, wherein the isocyanate compound obtained in step (a) is represented by formula (3):

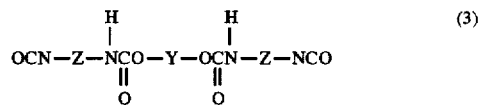

wherein

Y is a structural unit represented by formula (4) and Z represents a hydrocarbon group having 4 to 13 carbon atoms:

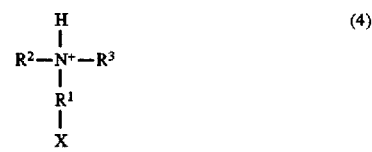

wherein $R^1$ represents an alkylene group having 1 or 2 carbon atoms, $R^2$ represents an alkylene group having 2 to 4 carbon atoms and having either a bonding site for one of the two urethane-bonding parts contained in formula (3) or bonding sites for the two urethane-bonding parts contained in formula (3), $R^3$ represents an alkylene group having 2 to 4 carbon atoms when $R^2$ has a bonding site for one of the two urethane-bonding parts, and represents a hydrogen atom or an alkyl group having 1 to 12 carbon atoms when $R^2$ has bonding sites for the two urethane-bonding parts, and X represents $—SO_3^-$, $—PO_3^-$, or $—COO^-$.

11. The polyurethane dispersion as claimed in claim 2, wherein the structural units $U_2$ each is the aliphatic hydrocarbon group represented by formula (2):

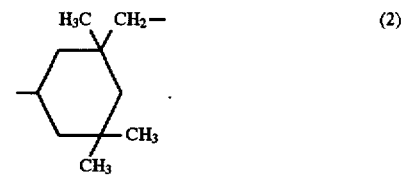

12. The polyurethane dispersion as claimed in claim 3, wherein the structural units $U_2$ each is the aliphatic hydrocarbon group represented by formula (2):

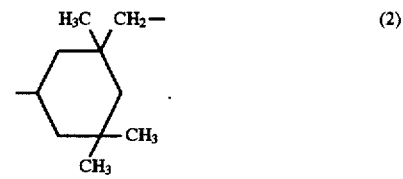

13. The polyurethane dispersion as claimed in claim 5, wherein X contained in the structural units $U_1$ is $—SO_3^-$.

14. The polyurethane dispersion as claimed in claim 3, wherein X contained in the structural units $U_1$ is $—SO_3^-$.

15. The polyurethane dispersion as claimed in claim 11, wherein X contained in the structural units $U_1$ is $—SO_3^-$.

16. The polyurethane dispersion as claimed in claim 12, wherein X contained in the structural units $U_1$ is $-SO_3^-$.

17. The polyurethane dispersion as claimed in claim 12, wherein the structural units $U_3$ each is a polycarbonate chain.

18. The polyurethane dispersion as claimed in claim 3, wherein the structural units $U_3$ each is a polycarbonate chain.

19. The polyurethane dispersion as claimed in claim 11, wherein the structural units $U_3$ each is a polycarbonate chain.

20. The polyurethane dispersion as claimed in claim 12, wherein the structural units $U_3$ each is a polycarbonate chain.

* * * * *